(12) United States Patent
Miyoshi (10) Patent No.: US 11,032,144 B2
(45) Date of Patent: Jun. 8, 2021

(54) NETWORK CONTROL SYSTEM, METHOD AND PROGRAM

(71) Applicant: NEC CORPORATION, Tokyo (JP)

(72) Inventor: Kazunori Miyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/629,101

(22) PCT Filed: Jul. 12, 2017

(86) PCT No.: PCT/JP2017/025416
§ 371 (c)(1),
(2) Date: Jan. 7, 2020

(87) PCT Pub. No.: WO2019/012627
PCT Pub. Date: Jan. 17, 2019

(65) Prior Publication Data
US 2020/0195502 A1   Jun. 18, 2020

(51) Int. Cl.
*H04L 12/24* (2006.01)
*H04L 29/06* (2006.01)

(52) U.S. Cl.
CPC ........ *H04L 41/0816* (2013.01); *H04L 41/044* (2013.01); *H04L 41/082* (2013.01); *H04L 41/12* (2013.01); *H04L 63/0869* (2013.01)

(58) Field of Classification Search
CPC ..... H04L 41/08; H04L 41/044; H04L 41/082; H04L 41/0803; H04L 41/0813;
(Continued)

(56) References Cited

U.S. PATENT DOCUMENTS 5,848,244 A * 12/1998 Wilson .................. H04L 41/044
709/221
9,680,772 B2 * 6/2017 Kothari ............... H04L 41/0859
(Continued)

FOREIGN PATENT DOCUMENTS

JP    2008-219149 A    9/2008
JP    2008-259047 A    10/2008
(Continued)

OTHER PUBLICATIONS

International Search Report for PCT/JP2017/025416 dated Sep. 5, 2017 [PCT/ISA/210].
(Continued)

*Primary Examiner* — Kostas J Katsikis
(74) *Attorney, Agent, or Firm* — Sughrue Mion, PLLC (57) ABSTRACT

A network control system includes link design unit for deciding, as a configuration of one network formed by connecting a plurality of nodes having a communication function, a configuration of distributed networks included in the network and specific links for forming the network by connecting the distributed networks; and network configuration switching unit for switching the configuration of the network by logically enabling or disabling the specific links on request at least in a state where links other than the specific links are enabled, in which the link design unit decides the configuration of the distributed networks and the specific links based on a cluster hierarchical structure corresponding to a formation process of the one network which is formed as a result of sequentially adding links, which connect the nodes, based on a connection weight decided in accordance with a degree of spread or complexity of the network after connection.

15 Claims, 9 Drawing Sheets

(58) Field of Classification Search
CPC . H04L 41/0816; H04L 41/0893; H04L 41/12; H04L 63/0869; H04L 63/08; H04L 63/20; H04L 45/02; H04L 9/32; H04L 9/3273; H04W 36/0055; H04W 24/02
See application file for complete search history.

(56) References Cited

U.S. PATENT DOCUMENTS

| | | | | |
|---|---|---|---|---|
| 9,762,430 | B2* | 9/2017 | Hong | H04L 41/0803 |
| 10,015,049 | B2* | 7/2018 | Sabev | H04L 41/0846 |
| 10,333,851 | B2* | 6/2019 | Li | H04M 15/854 |
| 10,418,762 | B2* | 9/2019 | Zimmermann | H05K 5/0247 |
| 10,560,355 | B2* | 2/2020 | Pani | H04L 41/145 |
| 10,630,544 | B2* | 4/2020 | Velikov | H04L 41/0813 |
| 10,732,879 | B2* | 8/2020 | Niell | H03K 19/1731 |
| 2003/0051049 | A1* | 3/2003 | Noy | H04L 41/5054 |
| | | | | 709/238 |
| 2011/0305143 | A1* | 12/2011 | Gray | H04L 45/66 |
| | | | | 370/242 |
| 2014/0089473 | A1* | 3/2014 | Nakano | H04L 41/044 |
| | | | | 709/221 |
| 2014/0181573 | A1* | 6/2014 | Goss | H04L 45/00 |
| | | | | 714/5.11 |
| 2015/0127799 | A1* | 5/2015 | Harper | H04L 69/40 |
| | | | | 709/223 |
| 2015/0180720 | A1* | 6/2015 | Merchant | H04L 41/08 |
| | | | | 709/204 |
| 2015/0256407 | A1* | 9/2015 | Lizawa | H04L 41/0893 |
| | | | | 370/254 |
| 2015/0281398 | A1* | 10/2015 | Walls | H04L 41/0876 |
| | | | | 709/226 |
| 2016/0276830 | A1* | 9/2016 | Nasirian | H02J 3/18 |
| 2018/0077024 | A1* | 3/2018 | Zhang | H04L 41/12 |
| 2018/0152355 | A1* | 5/2018 | Tang | H04L 45/026 |
| 2018/0152540 | A1* | 5/2018 | Niell | G06F 3/0608 |
| 2018/0331885 | A1* | 11/2018 | Raymond | H04L 41/044 |
| 2018/0351786 | A1* | 12/2018 | Pope | H04L 67/10 |
| 2018/0367429 | A1* | 12/2018 | Pani | H04L 41/0893 |
| 2019/0021010 | A1* | 1/2019 | Senarath | H04L 41/044 |
| 2020/0195502 | A1* | 6/2020 | Miyoshi | H04L 63/0869 |

FOREIGN PATENT DOCUMENTS

| | | | |
|---|---|---|---|
| JP | 2014-063418 A | 4/2014 | |
| JP | 2015-530768 A | 10/2015 | |
| JP | 2015-226139 A | 12/2015 | |
| JP | 2017-034696 A | 2/2017 | |
| WO | 2014/108944 A1 | 7/2014 | |
| WO | WO-2017034605 A1 * | 3/2017 | H04W 24/02 |

OTHER PUBLICATIONS

Japanese Office Action for JP Application No. 2019-529375 dated Feb. 16, 2021 with English Translation.
Dimitris Achlioptas, et al., "Explosive Percolation in Random Networks", Science vol. 323, pp. 1453-1455, Mar. 13, 2009.

* cited by examiner

LINK CONNECTION DEGREE IN
POPULATION (PROBABILITY q)

NETWORK CONTROL SYSTEM, METHOD AND PROGRAM

CROSS REFERENCE TO RELATED APPLICATIONS

This application is a National Stage of International Application No. PCT/JP2017/025416 filed Jul. 12, 2017.

TECHNICAL FIELD

The present invention relates to a network control system, a network control method, and a network control program that control a network range according to the purpose.

BACKGROUND ART

It is desired to efficiently perform authenticity verification to verify whether fraud such as falsification or impersonation has been performed on a wide variety of IoT devices.

As the authenticity verification method, a centralized monitoring type in which one verification server monitors all of the target IoT devices, and a distributed monitoring type in which IoT devices monitor each other are considered, but in some cases, it is not enough to perform monitoring independently. For example, in case of the centralized monitoring type, the load on the verification server becomes a problem. Further, for example, in case of the distributed monitoring type, when it is desired to share information such as monitoring rules throughout the network, the sharing method becomes a problem.

PTL 1 discloses a method of split validation for hierarchically dividing validation tasks between two or more network entities.

Further, PTL 2 discloses that all or part of a network in which a plurality of network users are communicably connected to each other functionally or physically distributed and integrated in arbitrary units according to various loads or usage conditions.

CITATION LIST

Patent Literature

PTL 1: Japanese Patent Application Laid-Open No. 2017-034696

PTL 2: Japanese Patent Application Laid-Open No. 2008-219149

SUMMARY OF INVENTION

Technical Problem

In addition to authenticity verification, in order to manage and control devices on a large-scale/complex network, it is desirable that the centralized method and the distributed method can be appropriately switched and executed.

For this purpose, it is desirable that the network configuration itself can be switched efficiently in accordance with the switching of the control method for the devices on the network. For example, in a case where centralized control is performed for a certain network, the network needs to be composed of one cluster, but in a case where distributed control is performed, it is preferable that clustering is performed for each distributed control unit that is a unit for performing distributed control so as not to incur costs for unnecessary links. However, depending on the size and number of distributed control units, if clustering is performed for each distributed control unit, the number of clusters becomes too large so that processing costs are required to establish links for connecting clusters when switching to centralized control, and thus, how to balance these becomes a problem.

PTLs 1 and 2 do not disclose a method for efficiently switching the network configuration in accordance with switching between two of the centralized control method and the distributed control method. Note that the use of switching the network configuration is not limited to the switching of the control methods for nodes. For example, it is conceivable to switch the network configuration in accordance with the switching of a management method including an information sharing method for nodes.

Accordingly, an object of the present invention is to provide a network control system, a network control method, and a network control program which can efficiently switch between a network configuration suitable for centralized control or centralized management and a network configuration suitable for distributed control or distributed management in accordance with a control method or management method for nodes.

Solution to Problem

A network control system of the present invention includes link design means for deciding, as a configuration of one network formed by connecting a plurality of nodes having a communication function, a configuration of a plurality of distributed networks included in the one network and specific links for forming the one network by connecting the plurality of distributed networks; and network configuration switching means for switching the configuration of the network by logically enabling or disabling the specific links on request at least in a state where links other than the specific links are enabled, in which the link design means decides the configuration of the plurality of distributed networks and the specific links based on a cluster hierarchical structure corresponding to a formation process of the one network which is formed as a result of sequentially adding links, which connect the nodes, based on a connection weight decided in accordance with a degree of spread or complexity of the network after connection.

A network control method of the present invention includes deciding, as a configuration of one network formed by connecting a plurality of nodes having a communication function, a configuration of a plurality of distributed networks included in the one network and specific links for forming the one network by connecting the plurality of distributed networks based on a cluster hierarchical structure corresponding to a formation process of the one network which is formed as a result of sequentially adding links, which connect the nodes, based on a connection weight decided in accordance with a degree of spread or complexity of the network after connection; and switching the configuration of the network by logically enabling or disabling the specific links on request at least in a state where links other than the specific links are enabled.

A network control program of the present invention causes a computer to execute a process of deciding, as a configuration of one network formed by connecting a plurality of nodes having a communication function, a configuration of a plurality of distributed networks included in the one network and specific links for forming the one network by connecting the plurality of distributed networks based on a cluster hierarchical structure corresponding to a formation process of the one network which is formed as a result of sequentially adding links, which connect the nodes, based on a connection weight decided in accordance with a degree of spread or complexity of the network after connection; and a process of switching the configuration of the network by logically enabling or disabling the specific links on request at least in a state where links other than the specific links are enabled.

Advantageous Effects of Invention

According to the present invention, it is possible to efficiently switch a configuration of a network suitable for each situation depending on whether a control method or a management method for nodes is centralized or distributed.

DESCRIPTION OF EMBODIMENTS

Exemplary Embodiment 1

Figure 1:
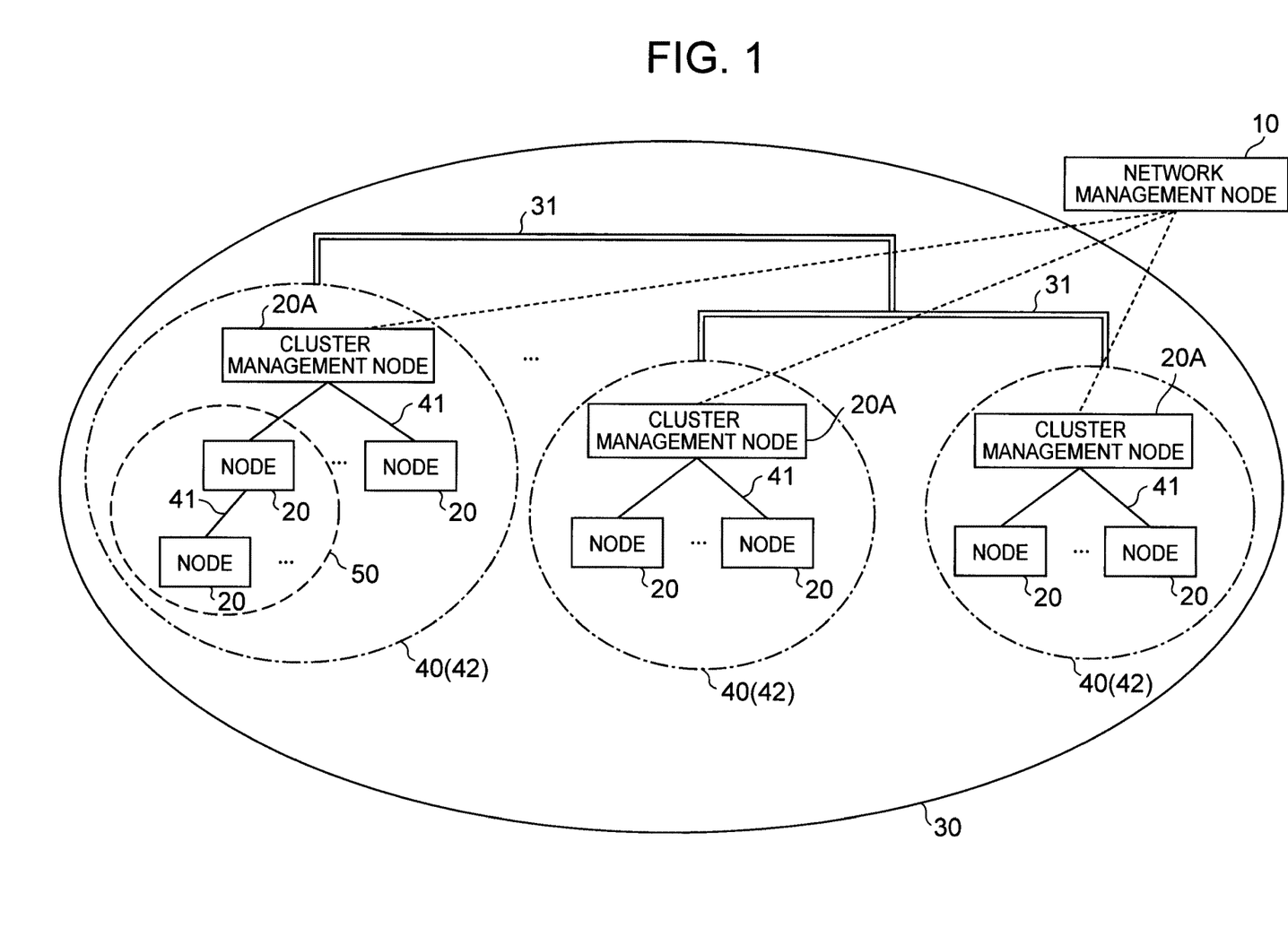
FIG. 1 It depicts an explanatory diagram illustrating an example of a network configuration according to a first exemplary embodiment.

Hereinafter, an exemplary embodiment of the present invention will be described with reference to the drawings. First, the network configuration of the present exemplary embodiment will be described with reference to FIG. 1. As illustrated in FIG. 1, a network to be controlled in the network control system of the present exemplary embodiment has a hierarchical structure. Specifically, a plurality of distributed networks 40 that are networks for distributed control are provided, and the plurality of distributed networks 40 are connected by inter-cluster links to form one centralized network 30. Each of the distributed networks 40 includes a distributed cluster 42 to which one or more nodes 20 to be controlled belong. More specifically, the nodes 20 belonging to the distributed cluster 42 are connected by intra-cluster links 41 to form a distributed network 40, respectively. Note that the distributed cluster 42 of this example includes at least one cluster management node 20A. Further, the distributed network 40 may include an existing network 50. Hereinafter, an inter-cluster link connecting the distributed clusters 42 each constituting the distributed network 40 is referred to as a distributed inter-cluster link 31, and a link connecting the nodes 20 in the distributed cluster 42 is referred to as the intra-cluster link 41.

Although FIG. 1 illustrates a configuration in which the centralized network 30 does not include a network management node 10, the centralized network 30 can also configure one network for a node set including the network management node 10. In that case, the network may be configured such that all the nodes 20 including the network management node 10 belong to one of the distributed networks 40.

In the present exemplary embodiment, such distributed networks 40 and the centralized network 30 formed by connecting the distributed networks 40 are designed and constructed using explosive percolation, which is one of the numerical models representing transition between two phases. That is, a network to be controlled is designed and constructed using explosive percolation as a mathematical model representing a phase transition phenomenon between the distributed network 40 and the centralized network 30. More specifically, the network is divided or unified such that explosive percolation occurs in the phase transition phenomenon in which cluster groups are unified to form one network by adding a small number of links to a network divided into a plurality of cluster groups, and thereby the network configuration is efficiently switched.

Figure 2:
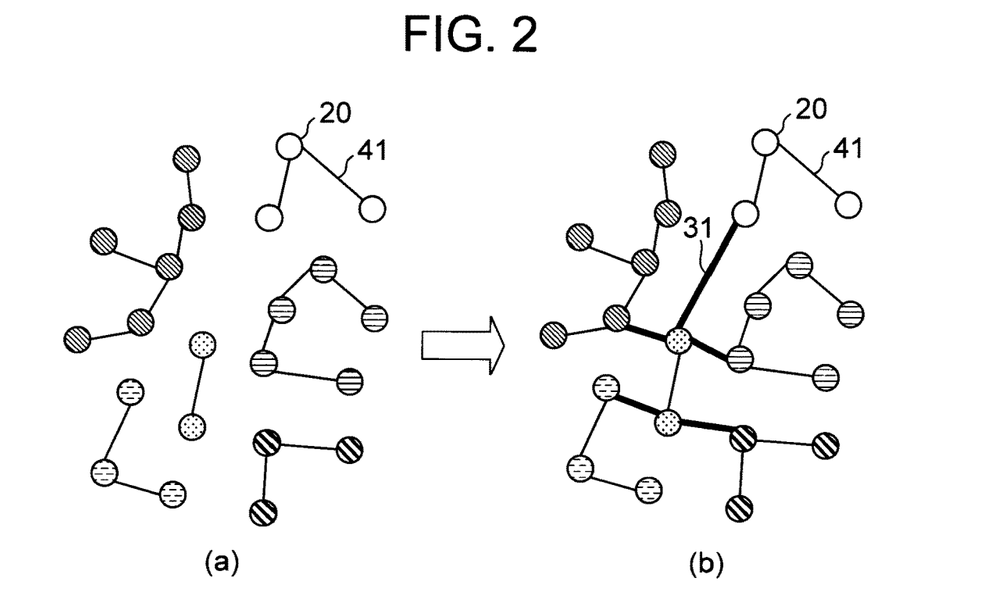
FIG. 2 It depicts an explanatory diagram illustrating an outline of a method of switching a network configuration.

FIG. 2 is an explanatory diagram illustrating an outline of a method of switching a network configuration. Here, for simplicity, the network is represented by a two-dimensional graph. In FIG. 2, circles represent the nodes 20 (including the cluster management node 20A) that are to be controlled. A line connecting nodes represents a link. FIG. 2(a) illustrates a state where six distributed networks 40 exist independently, and FIG. 2(b) illustrates a state where they are connected to form one centralized network 30. A thick line represents the distributed inter-cluster link 31 for causing an explosive percolation transition, and a thin line represents the intra-cluster link 41. The network configuration is switched by enabling (active) or disabling (non-active) the distributed inter-cluster links 31.

Figure 3:
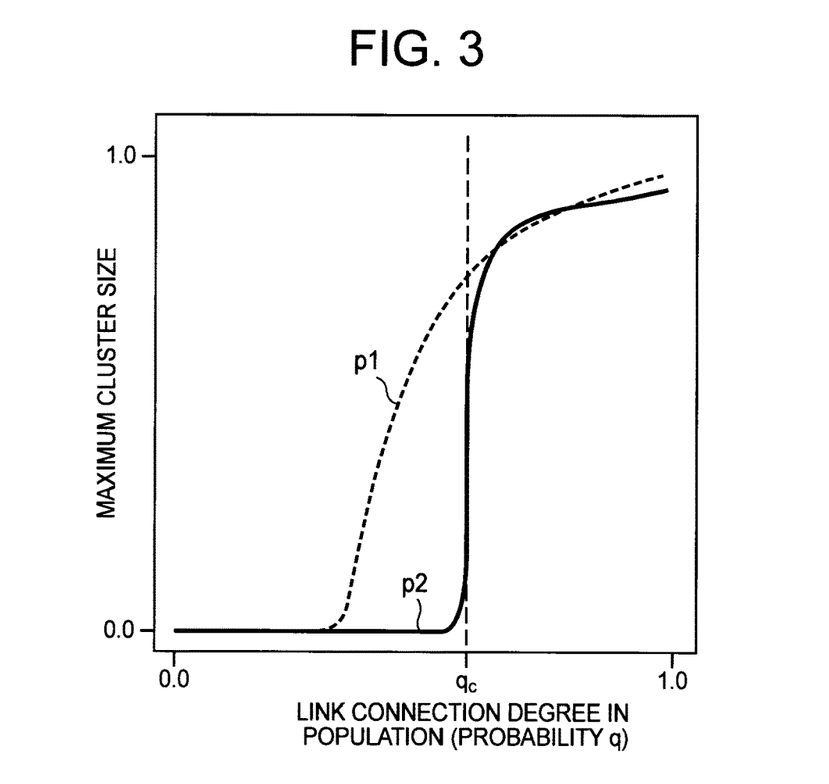
FIG. 3 It depicts a graph illustrating an explosive percolation transition phenomenon.

FIG. 3 is a graph illustrating an explosive percolation transition phenomenon. The vertical axis represents the maximum cluster size, and the horizontal axis represents a link connection degree (probability q) in a node set (population) to be connected. Here, the probability q corresponds to the number of links in the entire network. In FIG. 3, a broken line (p1 in the figure) illustrates the phase transition phenomenon when the links are connected at random, and a solid line (p2 in the figure) illustrates the explosive percolation phase transition phenomenon. As illustrated by p2 in FIG. 3, the explosive percolation phase transition is a phenomenon in which, when links are added according to a predetermined rule from a state in which nodes exist separately, the maximum cluster size is rapidly increased at the moment when the probability q exceeds a certain threshold. As compared with p1 in FIG. 3, it can be seen that the maximum cluster size is significantly increased before and after the critical value ($q_c$, in FIG. 3) for p2. This means that the increase/decrease of the maximum cluster size (network size) can be switched significantly by controlling a smaller number of links before and after the critical value (by adding/deleting links).

The link connection rule for causing the explosive percolation phase transition is, for example, "selecting a smaller product of the sizes of the clusters at both ends". Here, the critical value $q_c$ of the probability q at which the explosive percolation phase transition occurs can be adjusted according to a rule such as "adding a link only when the size of the clusters at both ends of the link is k or more".

In the present exemplary embodiment, for the plurality of nodes 20 to be controlled, by determining in advance the configuration of the distributed clusters 42 and the distributed inter-cluster link 31 connecting them for causing the explosive percolation transition, it is possible to switch between the distributed network 40 and the centralized network 30 with the control for a smaller number of links.

Hereinafter, a configuration method and a control method for the network based on such explosive percolation theory will be described more specifically.

Figure 4:
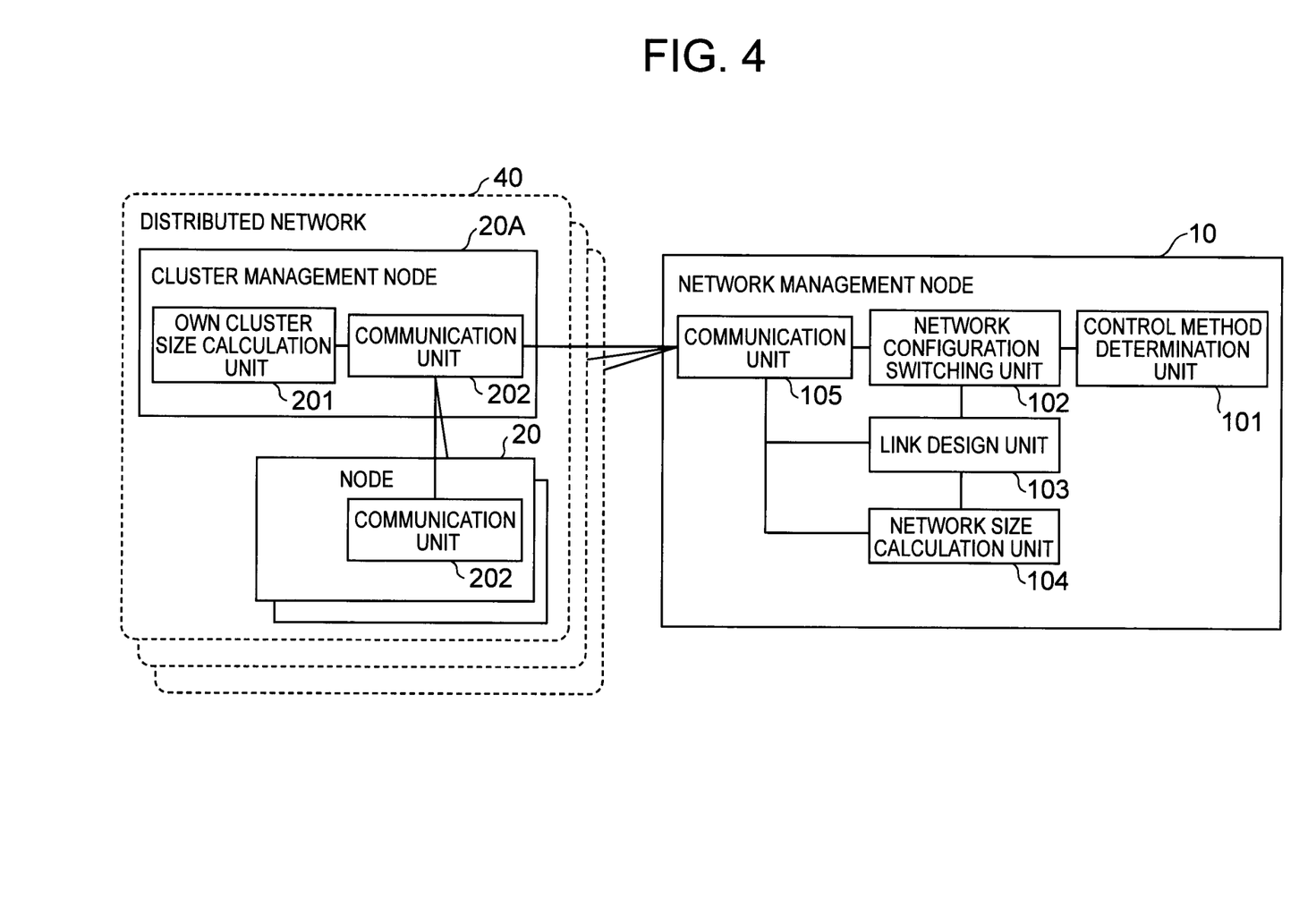
FIG. 4 It depicts a block diagram illustrating a configuration example of a network control system according to the first exemplary embodiment.

FIG. 4 is a block diagram illustrating a configuration example of the network control system according to the first exemplary embodiment. The network control system illustrated in FIG. 4 includes the network management node 10 and the plurality of nodes 20 to be controlled. In FIG. 4, a representative node of the distributed network 40 among the plurality of nodes 20 is illustrated as the cluster management node 20A. As illustrated in FIG. 4, the network control system includes the plurality of distributed networks 40, and the plurality of nodes 20 including one or more cluster management nodes 20A are connected by each distributed network 40.

The network management node 10 is a management node for switching the network configuration, and includes a control method determination unit 101, a network configuration switching unit 102, a link design unit 103, a network size calculation unit 104, and a communication unit 105.

The cluster management node 20A is provided for each distributed network 40 and is a representative node of the distributed cluster 42 that constitutes the corresponding distributed network 40, and the cluster management node 20A includes an own cluster size calculation unit 201, and a communication unit 202. Further, the nodes 20 other than the cluster management node 20A belonging to the distributed cluster 42 include at least the communication unit 202.

Here, at least one cluster management node 20A is provided for one distributed cluster 42. In FIG. 4, among the nodes 20 belonging to the distributed cluster 42, the cluster management node 20A and other nodes are distinguished from each other, but all the nodes 20 belonging to the distributed cluster 42 may have the function of the cluster management node 20A without being particularly distinguished. In that case, the network management node 10 may designate the node 20 that operates as the cluster management node 20A. Further, only some of the nodes 20 may have the function of the cluster management node 20A, and in this case, the network management node 10 may hold information on the nodes 20 that can operate as the cluster management node 20A.

In the following, the network control system is exemplified which sets a plurality of distributed networks 40 suitable for distributed control and a centralized network 30 for performing centralized control for the multiple nodes 20, and then switches between the distributed networks 40 and the centralized network 30 according to a control method for the nodes 20. At this time, the nodes 20 to be controlled may be connected to each other to configure the distributed network 40 with a suitable size in advance. In this case, the distributed network 40 is regarded as the existing network 50.

The control method determination unit 101 determines whether the control method for the node 20 is centralized control or distributed control. The control method determination unit 101 may determine the control method based on, for example, a control method switching instruction input from the user or an instruction from an upper-level application. In addition, the control method determination unit 101 may determine the control method with reference to a predetermined memory in which information indicating an operation mode or the like of the target system is stored, for example.

The network configuration switching unit 102 enables or disables the distributed inter-cluster link 31 determined in advance by the link design unit 103, in accordance with an instruction from the control method determination unit 101 described later. Specifically, the network configuration switching unit 102 causes switching to a designated state by instructing the nodes at both ends of the predetermined distributed inter-cluster link 31 to enable/disable the corresponding distributed inter-cluster link 31.

The link design unit 103 decides the configuration of the network to which the node 20 belongs, based on the explosive percolation theory. Specifically, the link design unit 103 adds each link (logical link) that connects the nodes 20, based on a link connection rule for causing explosive percolation, thereby deciding the configuration of each distributed network 40 and the distributed inter-cluster link 31 for connecting the distributed networks 40 to configure one centralized network 30. Hereinafter, two types of networks, the distributed network 40 and the centralized network 30, may be referred to as management target networks.

The network size calculation unit 104 calculates the overall size of the management target network regularly or irregularly.

The communication unit 105 communicates with other nodes. The communication unit 105 of the network management node 10 performs communication with at least the cluster management node 20A.

The own cluster size calculation unit 201 calculates the size of the cluster to which the own node belongs, regularly or irregularly, or in response to an instruction from the network management node 10. Note that the own cluster size calculation unit 201 can calculate a link cost instead of the cluster size. In that case, the own cluster size calculation unit 201 may calculate a link cost for clusters as the candidates to be connected from the own cluster.

The communication unit 202 communicates with other nodes. The communication unit 202 of the cluster management node 20A performs communication with at least the network management node 10 and with other nodes 20 of the cluster to which the own node belongs.

Further, the communication unit 202 has a function of enabling or disabling a communication link corresponding to a logical link with another designated node 20, based on an instruction from the network management node 10. For example, in case of enabling a communication link, the communication unit 202 may perform on-control for activating a port or the like used in the corresponding communication link. Further, for example, in case of disabling a communication link, the communication unit 202 may perform off-control for inactivating a port or the like used in the corresponding communication link. The control for enabling/disabling is merely an example, and the present invention is not limited to this.

Next, a link connection rule for causing explosive percolation in the present exemplary embodiment will be described. The link connection rule for causing explosive percolation in the present exemplary embodiment is as follows.

1. Cluster Division at Start

First, if there is an existing network 50, a set of nodes 20 constituting the existing network 50 is set as a minimum cluster. Further, each of the nodes 20 that do not belong to the existing network 50 is set as the minimum cluster.

2. Cluster Merging

In the current cluster group, one of m link candidates that can connect any two clusters, which has the smallest connection weight, is selected to generate a new cluster (upper-level cluster).

3. Repeat above-described "1." until finally merging into one cluster. At this time, if the number of link candidates is less than m, m may be reduced.

4. Exclude redundant links and loop links when selecting link candidates.

Here, the connection weight is a weight set for a link connecting two clusters, and may be a weight according to the degree of spread or complexity of the network after connection by connecting the link. For example, the connection weight may be a weight based on the sizes of the clusters to be connected to both ends of the link candidate. As an example, the product or sum of the sizes of the clusters (for example, the number of nodes belonging to the cluster) to be connected to both ends of the link candidate may be used as the "connection weight". The connection weight may be a so-called link cost. That is, the cost when the nodes to be connected to both ends of the link transmit a packet from the link may be used as the "connection weight".

The upper limit m of the number of link candidates may be determined in advance or may be the number of link candidates that satisfy a predetermined condition. In the latter case, for example, it is possible to select only one link candidate having the smallest connection weight. Further, when the upper limit m of the number of link candidates is determined in advance, m link candidates may be selected at random without providing a condition, or can be selected after adding a condition. For example, starting with k=1 as the upper limit of the size of the cluster to be connected, m link candidates that connect clusters having the size of k or less can be selected. In the above example, when there is no more cluster having the size of k or less, k is increased. When there are m or more link candidates that satisfy the condition, m link candidates may be selected at random from the link candidates that satisfy the condition. In addition, when selecting a plurality of link candidates, it is more preferable to select uniformly and randomly. Further, when selecting a link candidate, a cluster head (node to be connected to the inter-cluster link) may or may not be fixed for each cluster.

The following is a specific example of link connection rules.

(A) In the current cluster configuration, m link candidates that can connect clusters are uniformly and randomly selected, and among the m link candidates, a link having the smallest product of the sizes of the clusters to be connected to both ends of the link is connected (cluster merging). When there are a plurality of link candidates having the same smallest product, one of them is selected at random. If the number of link candidates is less than m, m←m−1.

(B) In the current cluster configuration, m link candidates that can connect clusters are uniformly and randomly selected, and among the m link candidates, a link having the smallest sum of the sizes of the clusters to be connected to both ends of the link is connected (cluster merging). When there are a plurality of link candidates having the same smallest sum, one of them is selected at random. If the number of link candidates is less than m, m←m−1.

(C) In the current cluster configuration, m weighted link candidates that can connect clusters are uniformly and randomly selected, and among the m weighted link candidates, a link having the smallest weight (for example, link cost) attached to the link is connected (cluster merging). When there are a plurality of link candidates having the same smallest weight, one of them is selected at random. If the number of link candidates is less than m, m←m−1.

(D) In the current cluster configuration, two clusters are selected in order from the smallest cluster size, and the two clusters are connected (cluster merging).

(E) Starting with k=1 as the upper limit of the cluster size, m link candidates that can connect two clusters each having a cluster size of k or less are selected, and among the m link candidates, a link having the smallest product of the sizes of the clusters to be connected to both ends of the link is connected (cluster merging). If there is no more link candidate that can connect clusters having a size of k or less, k←k+1. If the number of link candidates is less than m, m←m−1.

(F) Starting with k=1 as the upper limit of the cluster size, m link candidates that can connect two clusters each having a cluster size of k or less are selected, and among the m link candidates, a link having the smallest sum of the sizes of the clusters to be connected to both ends of the link is connected (cluster merging). If there is no more link candidate that can connect clusters having a size of k or less, k←k+1. If the number of link candidates is less than m, m←m−1.

(G) Starting with k=1 as the upper limit of the cluster size, m weighted link candidates that can connect two clusters each having a cluster size of k or less are selected, and among the m weighted link candidates, a link having the smallest weight (for example, link cost) attached to the link is connected (cluster merging). If there is no more link candidate that can connect clusters having a size of k or less, k←k+1. If the number of link candidates is less than m, m←m−1.

For example, the link design unit 103 may add each link (logical link) for connecting the nodes 20 in accordance with any one of the link connection rules (A) to (G) described above, and may decide finally the configuration of one centralized network 30. It should be noted that which level is set as the distributed cluster 42 in the hierarchical structure of the finally generated cluster may be determined according to the size or the like of the distributed cluster 42. Note that as described above, in (A) to (G) described above, link candidates as redundant links and infinite loop links are excluded. Further, the cluster head may or may not be fixed.

Further, in order to realize the phase transition at a higher speed, a link may be formed such that a graph composed of cluster heads becomes an Entangled network. Here, the Entangled network is a network in which the First passage time of the Random walker is minimized (refer to International Publication No. 2014/108944).

Figure 5:
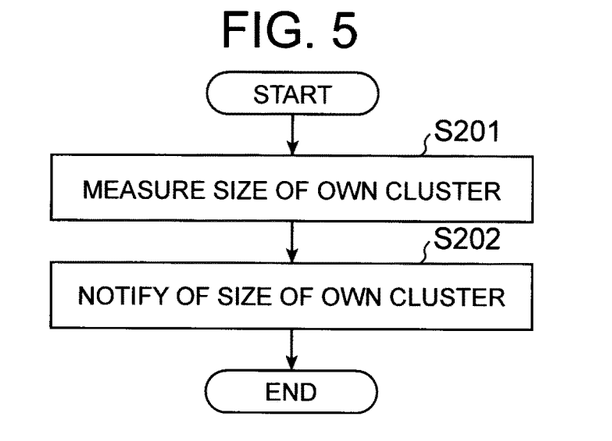
FIG. 5 It depicts a flowchart illustrating an operation example of a cluster management node 20A.

Next, the operation of the present exemplary embodiment will be described. First, the operation of the cluster management node 20A will be described. FIG. 5 is a flowchart illustrating an operation example of the cluster management node 20A.

In the example illustrated in FIG. 5, the own cluster size calculation unit 201 of the cluster management node 20A measures the size of the own cluster (step S201). The own cluster size calculation unit 201 may calculate the link cost of the own cluster for the designated cluster to be connected, instead of the size of the own cluster.

Next, the own cluster size calculation unit 201 notifies the network management node 10 of the measured size of the own cluster via the communication unit 202 (step S202).

Next, the operation of the network management node 10 will be described with reference to FIGS. 6 to 8. The operation of the network management node 10 is roughly divided into a network generation phase and a network configuration switching phase. Further, the network generation phase is roughly divided into a cluster merging phase and a switching link setting phase.

Figure 6:
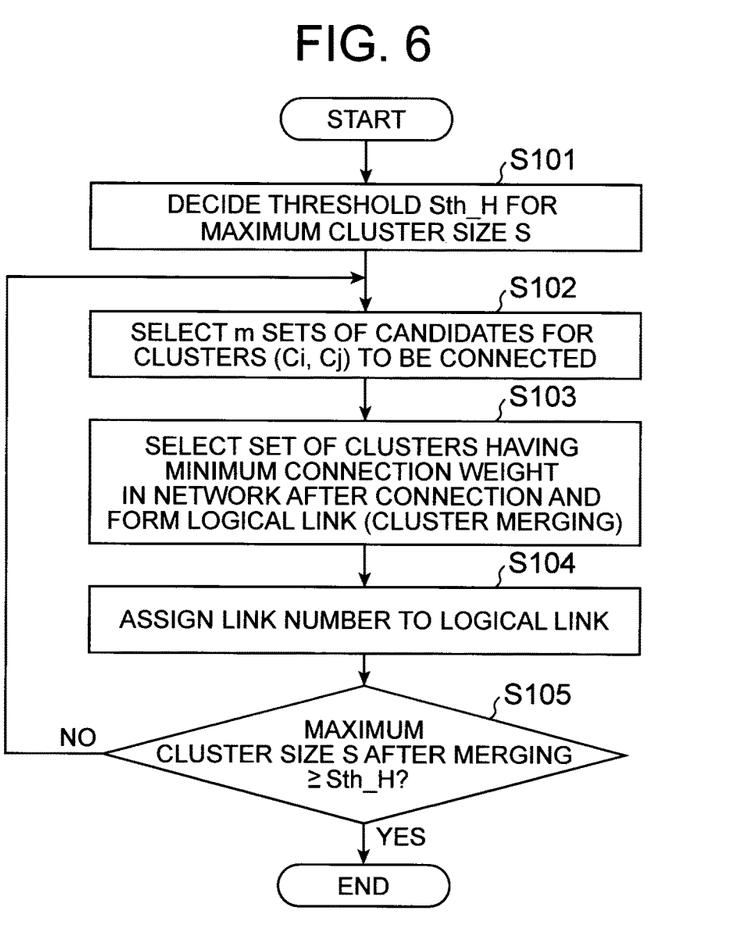
FIG. 6 It depicts a flowchart illustrating an operation example of a network management node 10.

FIG. 6 is a flowchart illustrating an example of the operation of the cluster merging phase of the network management node 10. The operation illustrated in FIG. 6 is performed by the link design unit 103.

First, the link design unit 103 decides a threshold Sth_H for the maximum cluster size S (step S101). Here, the threshold Sth_H corresponds to the lower limit size of the centralized network 30. This ensures that the size of the centralized network 30 is equal to or greater than the threshold Sth_H. Usually, the threshold Sth_H is set to be equal to the number of nodes 20. Note that in a case where it is not necessary to integrate all the nodes 20 to be controlled into one network for some reasons and a lower limit of the size of the centralized network 30 is decided in advance, the lower limit may be set.

Next, the link design unit 103 selects m sets of candidates for clusters ($C_i$, $C_j$) to be connected (step S102). Note that the cluster division at start is as described above. At this time, the link design unit 103 selects a link candidate that connects the cluster $C_i$ and the cluster $C_j$. With this operation, m link candidates for connecting the clusters are selected.

At this time, the network size calculation unit 104 may calculate the size of each of the currently formed networks based on the own cluster size notified from each of the cluster management nodes 20A, and the link design unit 103 may select the candidate for clusters to be connected, based on the calculated size.

Next, the link design unit 103 selects a set of clusters (link candidate) having the minimum connection weight in the network after connection, and forms a logical link (step S103: cluster merging). As a result, the corresponding set of clusters is merged to form a new cluster.

At this time, the link design unit 103 may select a set of clusters to be connected, based on the size of each of the currently formed networks, the size being calculated by the network size calculation unit 104.

When the clusters are merged, the link design unit 103 assigns a link number to the logical link used for merging, and stores connection information (such as information on the clusters of a connection destination and the nodes 20 in the corresponding clusters) (step S104). For example, the link design unit 103 assigns link numbers to links in an ascending order so that the order in which the links are given can be understood.

At this time, the link design unit 103 may instruct the nodes at both ends of the logical link used for merging to enable the link. Thereby, a network corresponding to the cluster after merging is formed. Further, the link design unit 103 may decide the cluster management node 20A for the cluster after merging, and cause the corresponding cluster management node 20A to calculate the size of the own cluster. When the size of the cluster after merging can be acquired from the information on the clusters before merging, control for the logical link may not be performed.

After cluster merging, the link design unit 103 determines whether the maximum cluster size S is equal to or greater than the threshold Sth_H (step S105). If S≥Sth_H, the process is ended (Yes in step S105), and if not, the process returns to step S102 (No in step S105). In a case where the upper limit of the size of the centralized network 30 is decided instead of the lower limit, the link design unit 103 may determine whether the maximum cluster size S exceeds the upper limit instead of the operation of step S105. If the maximum cluster size S exceeds the upper limit, the link design unit 103 deletes the last added link and ends the process. Otherwise, the process may return to step S102.

Figure 7:
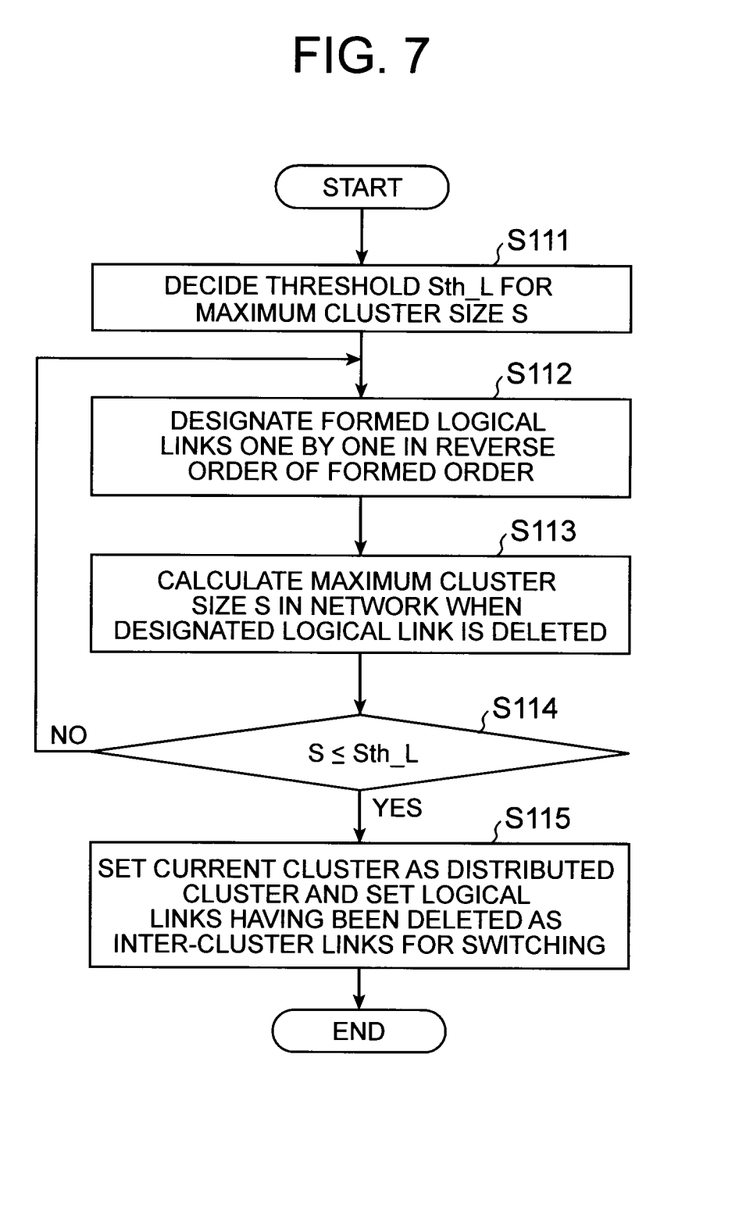
FIG. 7 It depicts a flowchart illustrating an operation example of a network management node 10.

FIG. 7 is a flowchart illustrating an example of the operation of the switching link setting phase of the network management node 10. The operation illustrated in FIG. 7 is performed by the link design unit 103.

First, the link design unit 103 decides a threshold Sth_L for the maximum cluster size S (step S111). Here, the threshold Sth_L corresponds to the upper limit size of the distributed network 40. This ensures that the size of all of the distributed networks 40 is equal to or smaller than the threshold Sth_L. However, when the distributed network 40 includes the existing network 50, the distributed network 40 including the existing network 50 having a size exceeding the threshold Sth_L is excluded.

Next, the link design unit 103 designates the logical links formed in the cluster merging phase one by one in the reverse order of the formed order (step S112).

Next, the link design unit 103 calculates the maximum cluster size S in the network when the designated logical link is deleted (step S113: cluster decomposition).

At this time, the link design unit 103 may instruct the nodes at both ends of the logical link to be deleted, to disable the link. Thereby, networks corresponding to the clusters after decomposition are formed. Furthermore, the link design unit 103 may cause the cluster management node 20A of each cluster after decomposition to calculate the size of the own cluster. In this way, the network size calculation unit 104 may be able to calculate the size of each of the currently formed networks. When the size of the clusters after decomposition can be acquired from the information on each cluster collected during merging, control for the logical link may not be performed.

Next, the link design unit 103 determines whether the calculated maximum cluster size S is equal to or smaller than the threshold Sth_L (step S114). If S≤Sth_L, the process proceeds to step S115 (Yes in step S114), and if not, the process returns to step S112 (No in step S114).

At this time, the network size calculation unit 104 may calculate the current size of each cluster, based on the own cluster size notified from each of the cluster management nodes 20A or the information on each cluster collected during merging, and the link design unit 103 may acquire the maximum cluster size S based on the calculated size.

In step S115, the link design unit 103 sets each of the clusters remaining at this time point (clusters remaining as a result of deleting the logical links in reverse order) as the distributed cluster 42, and sets the logical links that have been deleted as the distributed inter-cluster links 31. Then, the link design unit 103 stores the configuration of the distributed cluster 42 and the information on the distributed inter-cluster link 31 and ends the process. At this time, if there is a logical link disabled in a logical link (intra-cluster link 41) other than the distributed inter-cluster link 31, the link design unit 103 instructs the nodes at both ends of the corresponding logical link to enable the link, to configure a plurality of distributed networks 40. Note that the link design unit 103 may further enable the distributed inter-cluster link 31 to configure the centralized network 30.

Figure 8:
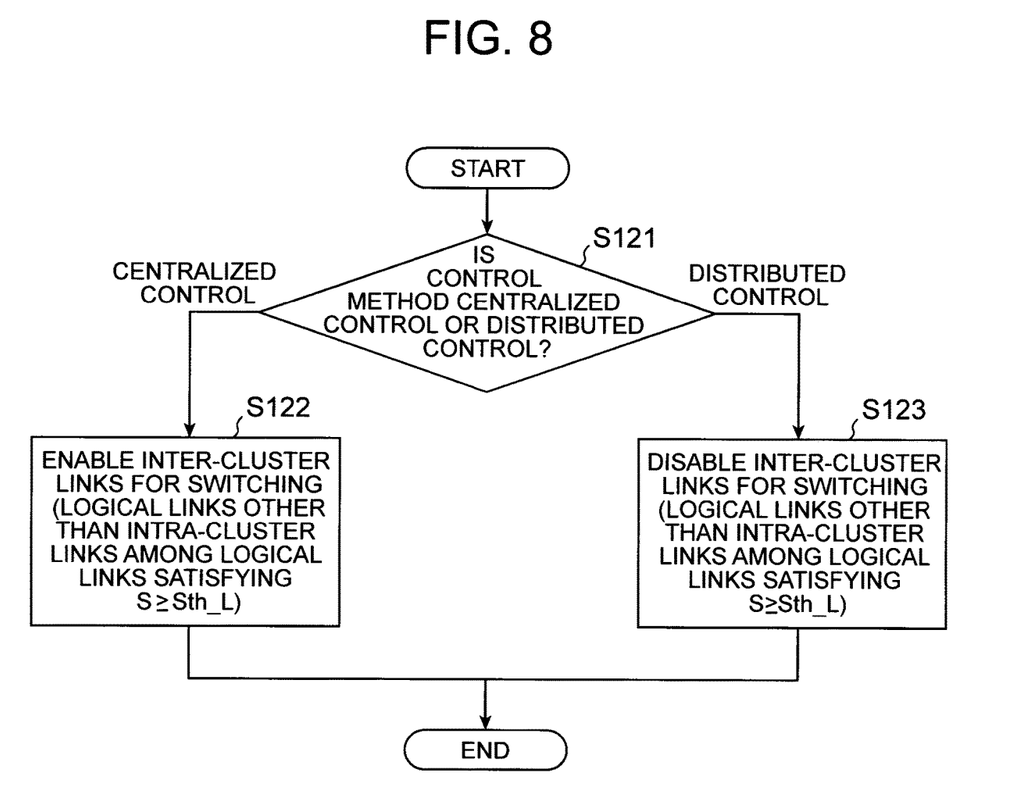
FIG. 8 It depicts a flowchart illustrating an operation example of a network management node 10.

FIG. 8 is a flowchart illustrating an example of the operation of the network configuration switching phase of the network management node 10.

First, the control method determination unit 101 determines a control method for the nodes 20 (step S121). If the control method is centralized control, the process proceeds to step S122, and If the control method is distributed control, the process proceeds to step S123.

In step S122, the network configuration switching unit 102 performs control of enabling the distributed inter-cluster links 31 set in the switching link setting phase, that is, the links other than the intra-cluster links 41 among the logical links satisfying the maximum cluster size S ≥Sth_L.

In step S123, the network configuration switching unit 102 performs control of disabling the distributed inter-cluster links 31 set in the switching link setting phase, that is, the links other than the intra-cluster links 41 among the logical links satisfying the maximum cluster size S ≥Sth_L.

As described above, according to the present exemplary embodiment, the inter-cluster link for causing the explosive percolation transition phenomenon is specified to construct a hierarchical network, and the inter-cluster link is controlled according to the control method. The network configuration can be switched from a centralized network to a distributed network and vice versa with control for a smaller number of links. Therefore, the network configuration can be switched efficiently according to the control method.

FIG. 4 illustrates a configuration in which a plurality of cluster management nodes 20A calculate the sizes of the own clusters, respectively, and notify the network management node 10, but in a case where the size of each cluster can be calculated when the network management node 10 designs the network, the cluster management node 20A may not be provided.

Exemplary Embodiment 2

Figure 9:
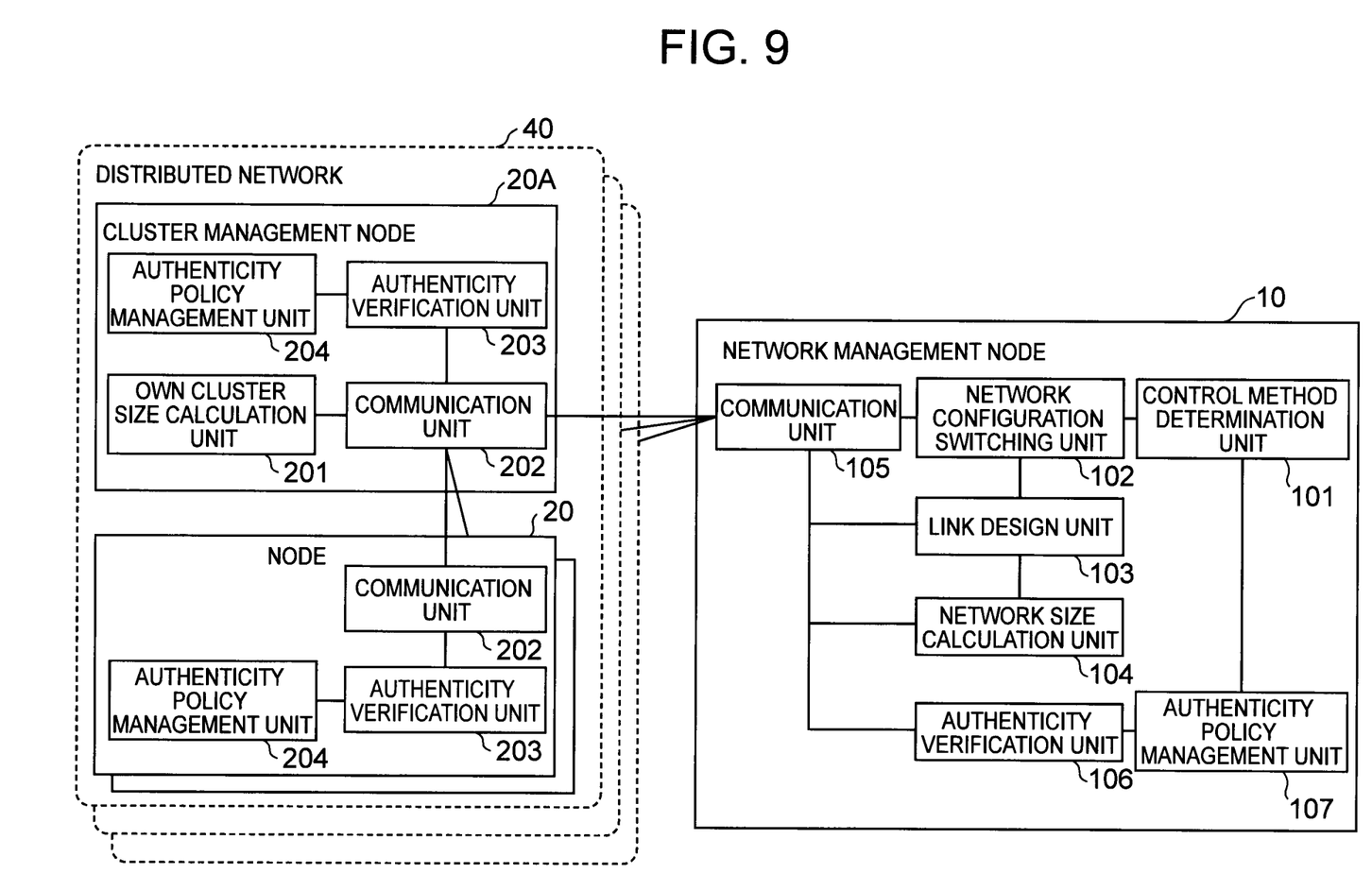
FIG. 9 It depicts a block diagram illustrating a configuration example of an authenticity verification system according to a second exemplary embodiment.

Next, a second exemplary embodiment of the present invention will be described. The present exemplary embodiment is an example in which the network control system of the first exemplary embodiment is applied to an authenticity verification system. FIG. 9 is a block diagram illustrating a configuration example of the authenticity verification system according to the present exemplary embodiment. The authenticity verification system of the present exemplary embodiment includes the network management node 10 and the plurality of nodes 20 to be controlled. Note that also in FIG. 9, a representative node of the distributed network 40 among the plurality of nodes 20 is illustrated as the cluster management node 20A. As illustrated in FIG. 9, the network control system of the present exemplary embodiment includes the plurality of distributed networks 40, and the plurality of nodes 20 including one or more cluster management nodes 20A are connected by each distributed network 40.

In the present exemplary embodiment, an authenticity verification unit and an authenticity policy management unit 107 are added to each of the network management node 10 and the nodes 20 to be controlled including the cluster management node 20A. Specifically, the network management node 10 further includes an authenticity verification unit 106 and an authenticity policy management unit 107 in addition to the configuration of the first exemplary embodiment. Each of the nodes 20 further includes an authenticity verification unit 203 and an authenticity policy management unit 204 in addition to the configuration of the first exemplary embodiment.

The authenticity verification unit 106 verifies the authenticity of the node 20 in the distributed network 40 to which the authenticity verification unit 106 belongs, according to the authenticity policy held in the authenticity policy management unit 107. Note that in addition to the authenticity verification function, the authenticity verification unit 106 of the network management node 10 may have a function of receiving an authenticity verification result from the cluster management node 20A, and a function of notifying, in accordance with the update of the authenticity policy, the cluster management node 20A of the updated authenticity policy.

The authenticity policy management unit 107 stores a policy for verifying authenticity. The policy may include information on a method for determining authenticity and information indicating an authenticity verification strategy (partner, timing, and the like of mutual authenticity verification).

The authenticity verification unit 203 verifies the authenticity of the node 20 in the distributed network 40 to which the authenticity verification unit 203 belongs, according to the authenticity policy held in the authenticity policy management unit 204. Further, in case of the cluster management node 20A, the authenticity verification unit 203 of the cluster management node 20A may have a function of collecting verification results from the nodes 20 in the distributed network 40 to which the authenticity verification unit 203 itself belongs and notifying the network management node 10, and a function of notifying other nodes 20 in the distributed network 40 to which the authenticity verification unit 203 itself belongs, of the authenticity policy notified from the network management node 10.

The authenticity policy management unit 204 stores a policy for verifying authenticity, which is notified from the network management node 10 or the cluster management node 20A.

In such a configuration, in a case where it is desired to cause each node 20 to perform authenticity verification in a distributed manner, the network management node 10 may cause the nodes 20 in each distributed network 40 to mutually verify authenticity by disabling the distributed inter-cluster link 31. In addition, in a case where it is desired to perform the authenticity verification in a centralized manner, the network management node 10 may construct the centralized network 30 by enabling the distributed inter-cluster link 31 and cause one verification server in the corresponding centralized network 30 to perform authenticity verification on each of the nodes 20.

In the above description, an example in which the network management node 10 also functions as a verification server has been described. However, the network management node 10 and the verification server may be provided separately. In addition, the network management node 10 may have a function of notifying each of the nodes 20 of a current verification mode (mode in which mutual authenticity verification is performed or mode in which centralized authenticity verification led by the verification server is performed) when switching the network configuration. The notification to each of the nodes 20 may be performed using the centralized network 30, or may be performed using a communication link with the separately provided cluster management node 20A.

In addition, the application involving switching of the network configuration is not limited to the authenticity verification, but can be applied to various control/management methods for nodes on the network.

Another example of the application involving switching of the network configuration is a node management method. For example, in a case where it is desired to manage/control the nodes 20 in a distributed manner, the network management node 10 may cause a management device in each distributed network 40 to individually perform management/control on each of the nodes 20 in the corresponding distributed network 40 by disabling the distributed inter-cluster link 31. On the other hand, in a case where it is desired to manage/control the nodes 20 in a centralized manner, the network management node 10 may construct the centralized network 30 by enabling the distributed inter-cluster link 31 and cause one management device in the corresponding centralized network 30 to perform management/control on all of the nodes 20. The network management node 10 may have a function of notifying each of the nodes 20 of a current management mode (mode in which management is individually performed in the distributed network or mode in which centralized management is performed using the centralized network) and the management device when switching the network configuration.

Further, another example of the application involving switching of the network configuration is an information sharing method for the nodes 20. For example, in a case where it is desired to distribute and hold information within a limited range, the network management node 10 may cause each distributed network 40 to hold information in a distributed manner by disabling the distributed inter-cluster link 31. On the other hand, in a case where it is desired to widely share information, the network management node 10 may construct the centralized network 30 by enabling the distributed inter-cluster link 31 and distribute information throughout the centralized network 30.

Figure 10:
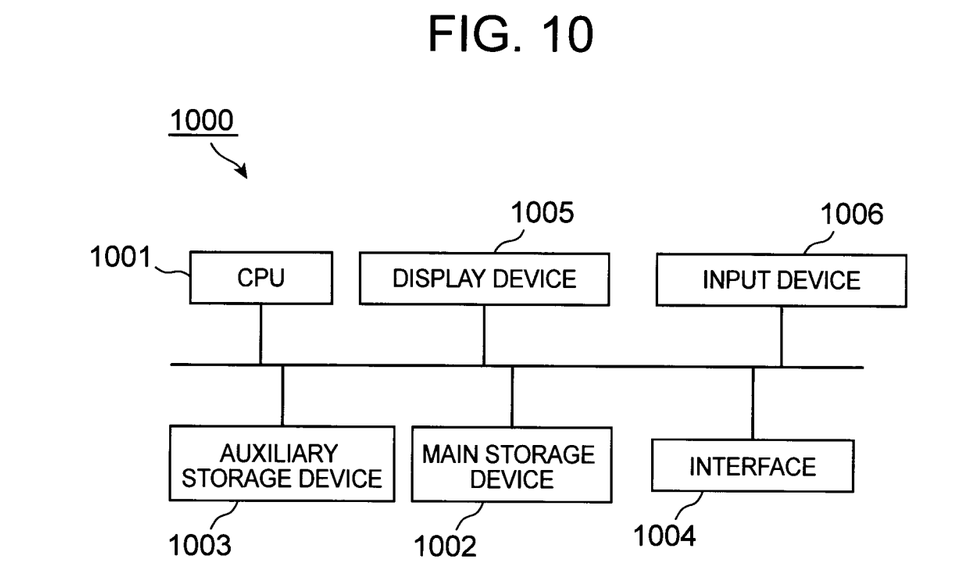
FIG. 10 It depicts a schematic block diagram illustrating a configuration example of a computer according to each exemplary embodiment of the present invention.

Next, a configuration example of a computer according to each exemplary embodiment of the present invention will be described. FIG. 10 is a schematic block diagram illustrating the configuration example of the computer according to each exemplary embodiment of the present invention. A computer 1000 includes a CPU 1001, a main storage device 1002, an auxiliary storage device 1003, an interface 1004, a display device 1005, and an input device 1006.

Each node of the network control system of each exemplary embodiment described above may be implemented in the computer 1000. In that case, the operation of each node may be stored in the auxiliary storage device 1003 in the form of a program. The CPU 1001 reads out a program from the auxiliary storage device 1003 and develops the program in the main storage device 1002 to execute predetermined processing in each exemplary embodiment according to the program. The CPU 1001 is an example of an information processing device that operates according to a program, and may include a micro processing unit (MPU), a memory control unit (MCU), a graphics processing unit (GPU), or the like in addition to a central processing unit (CPU).

The auxiliary storage device 1003 is an example of a non-temporary tangible medium. Other examples of the non-temporary tangible medium include a magnetic disk, a magneto-optical disk, a CD-ROM, a DVD-ROM, and a semiconductor memory connected via the interface 1004. In a case where this program is distributed to the computer 1000 via a communication line, the computer 1000 that has received the distribution may develop the program in the main storage device 1002 to execute the predetermined processing in each exemplary embodiment.

The program may be for realizing part of predetermined processing in each exemplary embodiment. Furthermore, the program may be a difference program that realizes predetermined processing in each exemplary embodiment in combination with another program already stored in the auxiliary storage device 1003.

The interface 1004 transmits and receives information to and from other devices. The display device 1005 presents information to the user. The input device 1006 accepts input of information from the user.

Further, depending on the processing content in the exemplary embodiment, some elements of the computer 1000 may be omitted. For example, if the node does not present information to the user, the display device 1005 may be omitted. For example, if the node does not accept input of information input from the user, the input device 1006 may be omitted.

In addition, some or all of the components of each device are implemented by a general-purpose or dedicated circuit (circuitry), a processor, or a combination thereof. These may be constituted by a single chip or may be constituted by a plurality of chips connected via a bus. Moreover, some or all of the components of each device may be implemented by a combination of the above-described circuit and the like and a program.

In a case where some or all of the components of each device are implemented by a plurality of information processing devices, circuits, and the like, the plurality of information processing devices, circuits, and the like may be arranged in a centralized manner or in a distributed manner. For example, the information processing device, the circuit, and the like may be implemented as a form of being connected via a communication network, such as a client and server system and a cloud computing system.

Figure 11:
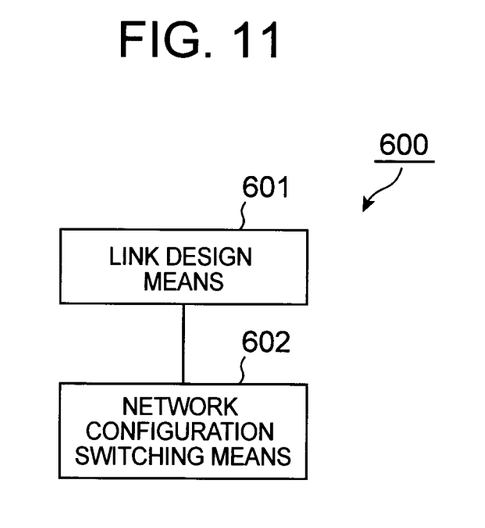
FIG. 11 It depicts a block diagram illustrating an outline of a network control system of the present invention.

Next, the outline of the present invention will be described. FIG. 11 is a block diagram illustrating the outline of the network control system of the present invention. A network control system 600 illustrated in FIG. 11 includes link design means 601 and network configuration switching means 602.

The link design means 601 (for example, link design unit 103) decides the configuration of a plurality of distributed networks included in one network and specific links for forming one network by connecting the plurality of distributed networks, as the configuration of one network formed by connecting a plurality of nodes having a communication function. More specifically, the link design means 601 decides the configuration of a plurality of distributed networks and specific links based on a cluster hierarchical structure corresponding to a formation process of one network which is formed as a result of sequentially adding links, which connect nodes, based on a connection weight decided in accordance with the degree of spread or complexity of the network after connection.

The network configuration switching means 602 (for example, the network configuration switching unit 102) switches the configuration of the network by logically enabling or disabling the specific links on request, at least in a state where links other than the specific links are enabled.

With such a configuration, it is possible to efficiently switch between a network configuration suitable for centralized control and a network configuration suitable for distributed control. This is because the network configuration is switched using the links for switching which are specified in the process of forming one network by connecting the links according to the link connection rule that can cause explosive percolation.

Figure 12:
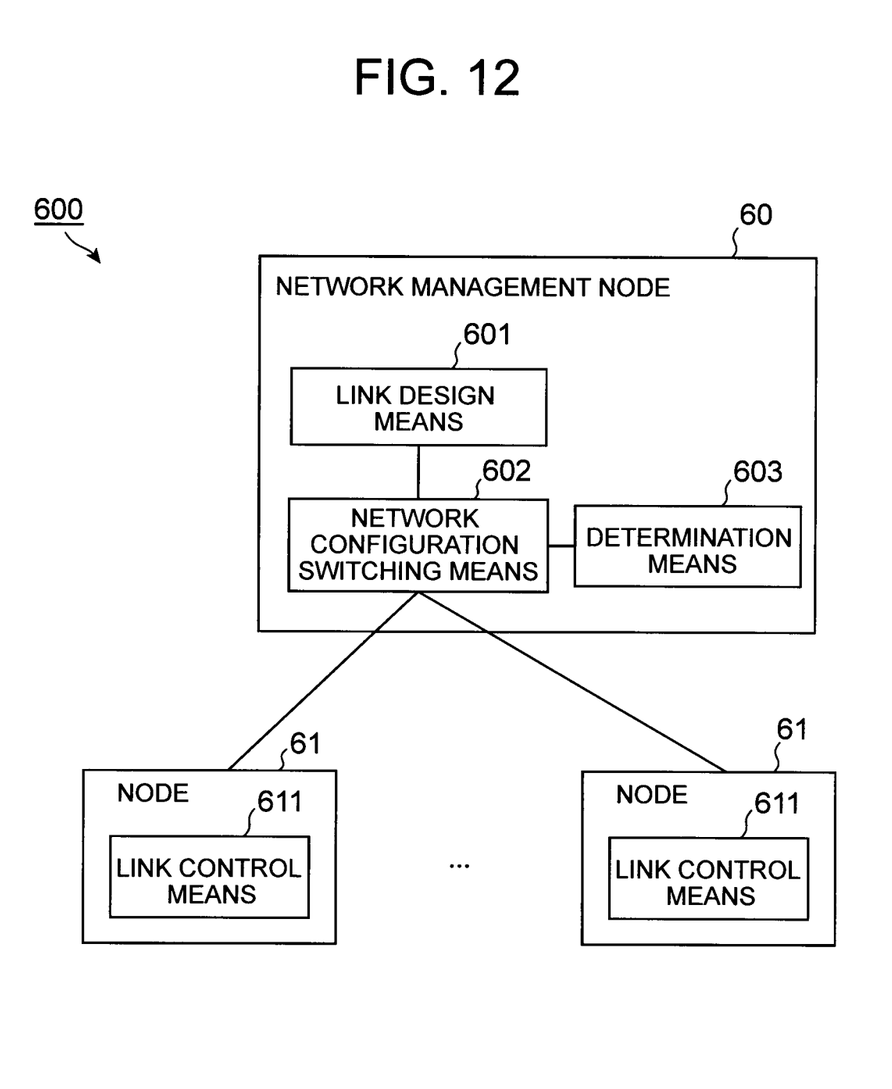
FIG. 12 It depicts a block diagram illustrating another configuration example of the network control system of the present invention.

Further, FIG. 12 is a block illustrating another configuration example of the network control system of the present invention. As illustrated in FIG. 12, the network control system 600 may further include determination means 603 that determines whether an information sharing method, a management method, or a control method for nodes is distributed or centralized.

The network control system 600 includes a network management node 60 and a plurality of nodes 61 to be controlled. The network management node 60 includes at least link design means and network configuration switching means, and each of the nodes 61 may include link control means 611 for enabling or disabling a communication link with another designated node according to an instruction from the network management node.

While the present invention has been described with reference to the present exemplary embodiment and examples, the present invention is not limited to the above exemplary embodiment and examples. The configurations and details of the present invention can be modified in various ways that can be understood by those skilled in the art within the scope of the present invention.

INDUSTRIAL APPLICABILITY

The present invention can be applied to applications for controlling/managing a plurality of nodes while switching between a state where a network is formed in a wider range for the nodes and a state where a plurality of networks in a narrower range are formed by separating the network.

REFERENCE SIGNS LIST

10 Network management node
20 Node
20A Cluster management node
30 Centralized network
31 Distributed inter-cluster link
40 Distributed network
41 Intra-cluster link
42 Distributed cluster
50 Existing network
101 Control method determination unit
102 Network configuration switching unit
103 Link design unit
104 Network size calculation unit
105 Communication unit
106 Authenticity verification unit
107 Authenticity policy management unit
201 Own cluster size calculation unit
202 Communication unit
203 Authenticity verification unit
204 Authenticity policy management unit
600 Network control system
60 Network management node
601 Link design means
602 Network configuration switching means
603 Determination means
61 Node
611 Link control means
1000 Computer
1001 CPU
1002 Main storage device
1003 Auxiliary storage device
1004 Interface
1005 Display device
1006 Input device

The invention claimed is:

1. A network control system comprising:
a link design unit that is implemented by a processor and that decides, as a configuration of one network formed by connecting a plurality of nodes having a communication function, a configuration of a plurality of distributed networks included in the one network and specific links for forming the one network by connecting the plurality of distributed networks; and
a network configuration switching unit that is implemented by the processor and that switches the configuration of the network by logically enabling or disabling the specific links on request at least in a state where links other than the specific links are enabled,
wherein the link design unit decides the configuration of the plurality of distributed networks and the specific links based on a cluster hierarchical structure corresponding to a formation process of the one network which is formed as a result of sequentially adding links, which connect the nodes, based on a connection weight decided in accordance with a degree of spread or complexity of the network after connection.

2. The network control system according to claim 1, wherein the connection weight is represented by a product of sizes of clusters to which the nodes of a connection destination belong.

3. The network control system according to claim 1, wherein the connection weight is represented by a sum of sizes of clusters to which the nodes of a connection destination belong.

4. The network control system according to claim 1, wherein the connection weight is represented by a link cost.

5. The network control system according to claim 1, wherein the link design unit decides the configuration of the plurality of distributed networks and the specific links based on the cluster hierarchical structure corresponding to the formation process of the one network which is formed as a result of sequentially adding links, which connect the nodes, based on a condition that the connection weight is the smallest among link candidates which are selected at random or satisfy a predetermined condition.

6. The network control system according to claim 5, wherein the link design unit sequentially adds links which connect two clusters selected in an ascending order of the size of the cluster.

7. The network control system according to claim 5, wherein the link design unit selects the link candidates using a condition that the size of the cluster to which the node of a connection destination belongs is equal to or smaller than a predetermined value while gradually increasing the predetermined value from one.

8. The network control system according to claim 1, wherein the links which connect the nodes do not include redundant links and loop links.

9. The network control system according to claim 1, wherein the link design unit sets a network constituted by each of the clusters belonging to a hierarchy in which the maximum size of the cluster is equal to or smaller than a predetermined threshold in a case where the links are released in a reverse order of adding the links in the cluster hierarchical structure, as the distributed network, and decides the links used for merging the clusters in the hierarchy or a higher hierarchy, as the specific links.

10. The network control system according to claim 1, wherein the link design unit assigns one cluster to one node when a process of connecting the plurality of nodes is started, or in a case where there is an existing network, the link design unit assigns one cluster to a node set belonging to the existing network.

11. The network control system according to claim 1, comprising:
a determination unit that is implemented by the processor and that determines whether a control method or a management method for the nodes is distributed or centralized,
wherein the network configuration switching unit enables or disables logically the specific links based on a determination result from the determination unit.

12. The network control system according to claim 11, wherein the network control system is for verifying authenticity of the node,
the determination unit determines whether an authenticity verification method performed for the node is mutual authenticity verification in which the nodes mutually verify authenticity or centralized authenticity verification in which one verification server verifies authenticity of each of the nodes, and
the network configuration switching unit disables logically the specific links when the determination result from the determination unit is the mutual authenticity verification, and enables logically the specific links when the determination result from the determination unit is centralized authenticity verification.

13. The network control system according to claim 1, comprising:
a network management node; and
a plurality of nodes to be controlled,
wherein the network management node includes at least the link design unit and the network configuration switching unit, and
each of the nodes includes a link control unit that enables or disables a communication link with another designated node according to an instruction from the network management node.

14. A network control method comprising:
deciding, as a configuration of one network formed by connecting a plurality of nodes having a communication function, a configuration of a plurality of distributed networks included in the one network and specific links for forming the one network by connecting the plurality of distributed networks based on a cluster hierarchical structure corresponding to a formation process of the one network which is formed as a result of sequentially adding links, which connect the nodes, based on a connection weight decided in accordance with a degree of spread or complexity of the network after connection; and
switching the configuration of the network by logically enabling or disabling the specific links on request at least in a state where links other than the specific links are enabled.

15. A non-transitory computer-readable recording medium in which a network control program is recorded, the network control program causing a computer to execute:
a process of deciding, as a configuration of one network formed by connecting a plurality of nodes having a communication function, a configuration of a plurality of distributed networks included in the one network and specific links for forming the one network by connecting the plurality of distributed networks based on a cluster hierarchical structure corresponding to a formation process of the one network which is formed as a result of sequentially adding links, which connect the nodes, based on a connection weight decided in accordance with a degree of spread or complexity of the network after connection; and
a process of switching the configuration of the network by logically enabling or disabling the specific links on request at least in a state where links other than the specific links are enabled.

* * * * *